United States Patent Office 2,746,939
Patented May 22, 1956

2,746,939

MANUFACTURE OF CELLULAR ARTICLES

David J. Beaver, Richmond Heights, Mo., assignor to Monsanto Chemical Company, St. Louis, Mo., a corporation of Delaware No Drawing. Application March 30, 1951,
Serial No. 218,557

13 Claims. (Cl. 260—2.5)

The present invention relates to the manufacture of sponge or cellular rubber articles. More particularly it relates to the usage of a new class of blowing agents in the manufacture of sponge or cellular rubber.

It has long been known in the manufacture of sponge or cellular rubber to incorporate in the rubber mix a substance or mixture of substances which on heating will decompose, liberating gases, and which in turn cause the rubber to swell, thereby producing a cellular structure. Heretofore many heat decomposable materials have been employed as blowing agents but generally possess inherent defects such as poor solubility, adverse effect on vulcanization, and the like. Sodium bicarbonate is an example of a commonly used blowing agent which possesses several inherent defects. For example, sodium bicarbonate is difficult to disperse in the rubber stock, adversely affects vulcanization action of some accelerators, and produces a coarse, uneven blow. Thus it is desirable to provide a heat decomposable material possessing good dispersion and solubility in rubber, neutral to vulcanization action, and its decomposition temperature so related to the vulcanization temperature that the breakdown is effected before vulcanization has set the rubber.

It has been found that admixture of maleic anhydride with a rubber vulcanization accelerator of the class comprising thiazoles, thiuram sulfides and dithiocarbamates provides a composition relatively stable at low temperatures but which gradually evolves carbon dioxide on heating. At vulcanizing temperatures the carbon dioxide is released to produce a porous product. Porous resin products have also been produced, as for example by heating polyvinyl chloride having incorporated therein one of the maleic anhydride mixtures.

The accelerator and maleic anhydride may be simply intimately mixed or they may be fused. Whether the components undergo reaction at this stage is not known with certainty. Examples of rubber vulcanization accelerators which may be used to produce the new blowing compositions are mercapto thiazole, mercaptobenzothiazole, dihydro mercapto thiazole or mercapto thiazoline, 1,3-bis-(2-benzothiazolylmercaptomethyl) urea, 2,2'-dithiobis benzothiazole, N-cyclohexyl 2-benzothiazolesulfenamide, the piperidine salt of cyclopentamethylene dithiocarbamic acid, zinc dimethyl dithiocarbamate, zinc diethyl dithiocarbamate, tetramethyl thiuram disulfide, tetramethyl thiuram monosulfide, tetraethyl thiuram monosulfide, tetraethyl thiuram disulfide, 2-mercapto 4-methyl thiazole, 2-mercapto 4,5-dimethyl thiazole and 2-mercapto 4-ethyl thiazole. This group is characterized by having a carbon atom linked to two sulfur atoms and a nitrogen atom,

either in open chain or ring structure.

As exemplary of the new compositions and the gas available therefrom maleic anhydride was heated and stirred with various accelerators below the decomposition point of the mixture. 10 parts by weight of the fusion mixtures were then heated at 110° C. in an oven and the carbon dioxide evolved measured by a suitable apparatus.

TABLE I

| Percent Composition of Fusion Mixture | | Volume of $CO_2$ | |
|---|---|---|---|
| Maleic Anhydride | Accelerator | Units Evolved | Percent Yield |
| 80 | 20 mercaptobenzothiazole | 925 | 50.8 |
| 77 | 23 mercaptobenzothiazole | 1,100 | 62.7 |
| 70 | 30 mercaptobenzothiazole | 1,010 | 63.2 |
| 54 | 46 mercaptobenzothiazole | 653 | 53.3 |
| 37 | 63 mercaptobenzothiazole | 300 | 35.6 |
| 80 | 20 2,2'-dithiobis benzothiazole | 970 | 53.2 |
| 76 | 24 2,2'-dithiobis benzothiazole | 1,250 | 72.0 |
| 70 | 30 2,2'-dithiobis benzothiazole | 1,180 | 74.0 |
| 54 | 46 2,2'-dithiobis benzothiazole | 950 | 72.6 |
| 37 | 63 2,2'-dithiobis benzothiazole | 605 | 71.8 |
| 75 | 25 N-cyclopentamethylene thiazole sulfenamide | 1,315 | 77.0 |
| 76 | 24 Tetramethyl thiuram disulfide | 1,230 | 71.0 |
| 76 | 24 mercapto thiazoline | 1,090 | 63.0 |

From the above examples it is obvious that the fusion mixtures of maleic anhydride are capable of imparting a high ratio of expansion to a rubber stock and the temperature of decomposition is in the range of ordinary vulcanization temperatures. Similar results were obtained with other accelerators of the class when fused or physically mixed with maleic anhydride such as N-cyclohexyl benzothiazole sulfenamide, N-cyclohexyl thiazoline sulfenamide, 4,5-dimethyl 2-mercapto thiazole, N,N-dimethyl 4,5-dimethyl thiazole sulfenamide, 1,3-bis-(2-benzothiazolymercaptomethyl) urea, zinc dimethyl dithiocarbamate, zinc dibutyl dithiocarbamate and zinc dimethyl dithiocarbamate.

Sulfur, vulcanization accelerators, zinc stearate, and alkaline materials such as the amines, the alkaline earth hydroxides, and the like may also be incorporated in the mixture and these activate the blowing properties. Mixtures of two or more of the accelerators may also be fused with maleic anhydride to produce an efficient blowing agent.

As illustrative of the invention the following examples are presented and it is to be understood that they are not intended to be limitative thereof.

Example 1

A fusion mixture comprising 115.5 parts by weight (substantially 77.0%) of maleic anhydride and 34.5 parts by weight (substantially 23.0%) of 2-mercaptobenzothiazole was prepared by heating said materials in a suitable container immersed in a steam bath for 15 minutes. An orange-brown resinous material weighing 141.6 units (94% yield) was obtained.

A sample of the fusion mix, above described, was easily and uniformly incorporated in a typical rubber stock comprising

| | Parts by weight |
|---|---|
| Smoked sheet rubber | 100.0 |
| Zinc oxide | 5.0 |
| Sulfur | 3.0 |
| Stearic acid | 1.5 |
| Tetramethyl thiuram disulfide | 0.5 |
| Mercaptobenzothiazole-maleic anhydride fusion product | 5.0 |

The above stock so compounded was vulcanized in a mold by heating for 30 minutes at 142° C. The cured product contained a multiplicity of pores of very fine uniform size.

Example 2

10 parts by weight (substantially 25) of 2-mercapto thiazoline was dissolved in 30 parts by weight (substantially 75%) of molten maleic anhydride. The fusion product on cooling was an orange colored resinous material, 38 parts by weight (95% yield).

5 parts by weight of the above prepared fusion mix was easily and uniformly incorporated in a typical rubber stock comprising

| | Parts by weight |
|---|---|
| Smoked sheet rubber | 100.0 |
| Zinc oxide | 5.0 |
| Sulfur | 3.0 |
| Stearic acid | 1.5 |
| Tetramethyl thiuram disulfide | 0.5 |

The above stock so compounded was vulcanized by heating in a mold for 30 minutes at 142° C. The cured product was of uniform quality and was permeated throughout with fine pores.

As further illustrative of the invention fusion mixtures were incorporated in a commercial formula comprising:

| | A | B | C | D |
|---|---|---|---|---|
| Smoked sheet rubber | 100 | 100 | 100 | 100 |
| Zinc oxide | 5 | 5 | 5 | 5 |
| Sulfur | 3 | 3 | 3 | 3 |
| Whiting | 30 | 30 | 30 | 30 |
| Stearic acid | 3 | 3 | 3 | 3 |
| Mineral rubber | 10 | 10 | 10 | 10 |
| Paraffin | 2 | 2 | 2 | 2 |
| Oleic acid | 8.5 | 8.5 | 8.5 | 8.5 |
| Blend of mineral and vegetable oil | 23 | 23 | 23 | 23 |
| Acetone-aniline condensation product | 1 | 1 | 1 | 1 |
| 1,3-Bis-(2-benzothiazolylmercaptomethyl) urea | 0.9 | 0.9 | 0.9 | 0.9 |
| Sodium carbonate | 17 | | | |
| Tetramethyl thiuram disulfide | | 0.75 | 0.75 | |
| Maleic anhydride (23%)-mercaptobenzothiazole (77%) fusion product | | 5.0 | 10.0 | 5.0 |

The above fusion product of maleic anhydride and mercaptobenzothiazole dispersed easily and uniformly in the rubber compositions.

Molds of suitable capacity were half filled, one-third filled, and one-fourth filled with stocks so compounded and vulcanized by heating for 20 minutes at 153° C. Upon examination of the blown products all completely filled the molds. The blown stocks B, C and D in all cases were superior to the corresponding sodium carbonate blown stocks (stock A) in texture, distribution of pores, fineness of pores, homogeneity of pore size. The B, C, and D stocks were firm yet rubbery and did not exhibit "bloom," nor show any evidence of pre-vulcanization or over-curing.

The gas evolved in all examples was identified as carbon dioxide by precipitation as barium carbonate from a barium hydroxide solution, by the absence of sulfur, and by negative tests for carbon monoxide.

It is apparent to those skilled in the art that the weight ratios of the accelerator to maleic anhydride in the fusion or physical mixture and the amount of blowing agent incorporated in the stock may vary depending upon the "size blow" desired, the rate of blowing required, and the conditions of the system, such as temperature and pressure. Furthermore other compounding and vulcanizing ingredients than those specifically mentioned may be employed where convenient or desirable without departing from the spirit or scope of the invention.

The word "rubber" as used in the specification and claims, unless otherwise modified, is intended to be used in its generic sense to include rubber substitutes, natural rubber, synthetic rubber, and the like.

What is claimed is:

1. The process of producing chemically blown sponge rubber which comprises heating a sulfur vulcanizable rubber and sulfur in the presence of at least 5% by weight on the rubber of a gas generating agent consisting essentially of a composition obtained by heating below the decomposition point an admixture of 23–80 parts by weight of maleic anhydride and 77–20 parts by weight of a rubber vulcanization accelerator having a carbon atom linked to two sulfur atoms and a nitrogen atom of the class consisting of thiazoles, thiuram sulfides and dithiocarbamates.

2. The process of producing chemically blown sponge rubber which comprises heating a sulfur vulcanizable rubber and sulfur in the presence of at least 5% by weight on the rubber of a gas generating agent consisting essentially of a composition obtained by heating below the decomposition point an admixture of 23–80 parts by weight of maleic anhydride and 77–20 parts by weight of a thiazole rubber vulcanization accelerator having a carbon atom linked to two sulfur atoms and a nitrogen atom.

3. The process of producing chemically blown sponge rubber which comprises heating a sulfur vulcanizable rubber and sulfur in the presence of at least 5% by weight on the rubber of a gas generating agent consisting essentially of a composition obtained by heating below the decomposition point an admixture of about 77 parts by weight maleic anhydride and about 23 parts by weight 2-mercaptobenzothiazole.

4. The process of producing chemically blown sponge rubber which comprises heating a sulfur vulcanizable rubber and sulfur in the presence of at least 5% by weight on the rubber of a gas generating agent consisting essentially of a composition obtained by heating below the decomposition point an admixture of 23–80 parts by weight of maleic anhydride and 77–20 parts by weight of 2-mercaptodimethylthiazole.

5. The process of producing chemically blown sponge rubber which comprises heating a sulfur vulcanizable rubber and sulfur in the presence of at least 5% by weight on the rubber of a gas generating agent consisting essentially of a composition obtained by heating below the decomposition point an admixture of 23–80 parts by weight of maleic anhydride and 77–20 parts by weight of 2,2'-dithiobis benzothiazole.

6. The process of producing chemically blown sponge rubber which comprises heating a sulfur vulcanizable rubber and sulfur in the presence of at least 5% by weight on the rubber of a gas generating agent consisting essentially of a composition obtained by heating below the decomposition point an admixture of 23–80 parts by weight of maleic anhydride and 77–20 parts by weight of 2,2'-dithiobis dimethylthiazole.

7. The process of producing chemically blown sponge rubber which comprises heating a sulfur vulcanizable rubber and sulfur in the presence of at least 5% by weight on the rubber of a gas generating agent consisting essentially of a composition obtained by heating below the decomposition point an admixture of 23–80 parts by weight of maleic anhydride and 77–20 parts by weight of tetramethyl thiuram disulfide.

8. A vulcanizable rubber composition comprising a sulfur vulcanizable rubber, sulfur, at least 5% on the rubber of a gas generating agent consisting essentially of a composition obtained by heating below the decomposition point an admixture of 23–80 parts by weight of maleic anhydride and 77–20 parts by weight of a rubber vulcanization accelerator having a carbon atom linked to two sulfur atoms and a nitrogen atom of the class consisting of thiazoles, thiuram sulfides and dithiocarbamates and a vulcanization accelerator independent of that contained in the preformed admixture.

9. A vulcanizable rubber composition comprising a sulfur vulcanizable rubber, sulfur, at least 5% on the rubber of a gas generating agent consisting essentially of a composition obtained by heating below the decomposition point an admixture of 23–80 parts by weight of maleic anhydride and 77–20 parts by weight of a thiazole rubber vulcanization accelerator having a carbon atom linked to two sulfur atoms and a nitrogen atom and a vulcanization accelerator independent of that contained in the preformed admixture.

10. A vulcanizable rubber composition comprising a sulfur vulcanizable rubber, sulfur, at least 5% on the rubber of a gas generating agent consisting essentially of a composition obtained by heating below the decomposition point an admixture of about 77 parts by weight maleic anhydride and about 23 parts by weight 2-mercaptobenzothiazole and a vulcanization accelerator independent of that contained in the preformed admixture.

11. A vulcanizable rubber composition comprising a sulfur vulcanizable rubber, sulfur, at least 5% on the rubber of a gas generating agent consisting essentially of a composition obtained by heating below the decomposition point an admixture of 23–80 parts by weight of maleic anhydride and 77–20 parts by weight of 2-mercaptodimethylthiazole and a vulcanization accelerator independent of that contained in the preformed admixture.

12. A vulcanizable rubber composition comprising a sulfur vulcanizable rubber, sulfur, at least 5% on the rubber of a gas generating agent consisting essentially of a composition obtained by heating below the decomposition point an admixture of 23–80 parts by weight of maleic anhydride and 77–20 parts by weight of 2,2'-dithiobis benzothiazole and a vulcanization accelerator independent of that contained in the preformed admixture.

13. A vulcanizable rubber composition comprising a sulfur vulcanizable rubber, sulfur, at least 5% on the rubber of a gas generating agent consisting essentially of a composition obtained by heating below the decomposition point an admixture of 23–80 parts by weight of maleic anhydride and 77–20 parts by weight of 2,2'-dithiobis dimethylthiazole and a vulcanization accelerator independent of that contained in the preformed admixture.

References Cited in the file of this patent

UNITED STATES PATENTS

| | | |
|---|---|---|
| 1,936,562 | Kilbourne | Nov. 21, 1933 |
| 1,981,168 | Gerke | Nov. 20, 1934 |
| 2,058,840 | Thies | Oct. 27, 1936 |
| 2,598,229 | Creed | May 27, 1952 |

OTHER REFERENCES (The) Rubber Age (London), April 1935, vol. XVI, No. 2, pages 59–60, published London, 43, Essex Street, Strand, W. C. 2 (TS 1870 R. 58).